US006816722B2

(12) United States Patent
Blom et al.

(10) Patent No.: US 6,816,722 B2
(45) Date of Patent: Nov. 9, 2004

(54) DETECTING AND PREVENTING FRAUDULENT USE IN A TELECOMMUNICATIONS NETWORK

(75) Inventors: Vesa Blom, Pirkkala (FI); Kari Einamo, Espoo (FI); Jaana Hurme, Tampere (FI); Petteri Mandelin, Tampere (FI); Esko Paldan, Lempaala (FI); Leena Rossi, Tampere (FI); Soili Haapala, Espoo (FI); Tomi Lindgren, Vantaa (FI); Markus Martin, Helsinki (FI); Raili Numminen, Tampere (FI)

(73) Assignee: Nokia, Inc., Espoo (FI)

(*) Notice: Subject to any disclaimer, the term of this patent is extended or adjusted under 35 U.S.C. 154(b) by 424 days.

(21) Appl. No.: 09/876,421

(22) Filed: Jun. 4, 2001

(65) Prior Publication Data
US 2002/0022474 A1 Feb. 21, 2002

Related U.S. Application Data

(63) Continuation of application No. PCT/FI99/01026, filed on Dec. 10, 1999.

(30) Foreign Application Priority Data

Dec. 23, 1998 (FI) ................................................. 982795

(51) Int. Cl.[7] .............................. H04M 1/66; H04Q 7/20
(52) U.S. Cl. ..................... 455/410; 455/405; 455/432.3; 455/433
(58) Field of Search ................................ 455/410, 411, 455/405, 406, 408, 417, 433, 565, 435.1, 432.3; 379/114.14, 127.02, 145, 189

(56) References Cited

U.S. PATENT DOCUMENTS 5,600,708 A    2/1997    Meche et al. ............... 455/411

(List continued on next page.)

FOREIGN PATENT DOCUMENTS

| EP | 0618713 A2 | 10/1994 | ............ H04M/3/22 |
| WO | WO 96/15643 | 5/1996 | ............ H04Q/7/38 |
| WO | WO 97/47152 | 12/1997 | ............ H04Q/7/38 |
| WO | WO 98/57514 | 12/1998 | ............ H04Q/7/38 |

OTHER PUBLICATIONS

Eleftheriadis et al, "User profile identification in future mobile communications system", IEEE network, Sep./Oct. 1994, pp. 33–39.*

(List continued on next page.)

Primary Examiner—Duc M. Nguyen
(74) Attorney, Agent, or Firm—Squire, Sanders & Dempsey L.L.P.

(57) ABSTRACT

The invention relates to a method and an arrangement against fraudulent use in a telecommunications network. The invention is based on the idea that at least one fraud profile identified by an identifier is created and the identifier is included in the subscriber data of some subscribers. Based on this identifier the fraud restriction parameters of the subscriber are retrieved from the subscriber's fraud profile, and these fraud restriction parameters are used in detecting and indicating possible fraudulent use. The fraud restriction parameters include values for different service limits, such as the maximum number of call forwarding re-quests and/or the maximum number of location updates during a certain period, and possibly at least for some features an action parameter related to a service limit and implemented when the service limit is reached.

16 Claims, 3 Drawing Sheets

U.S. PATENT DOCUMENTS

| | | | | |
|---|---|---|---|---|
| 5,627,886 A | | 5/1997 | Bowman | 379/111 |
| 5,729,597 A | * | 3/1998 | Bhusri | 379/115 |
| 5,802,157 A | * | 9/1998 | Clarke et al. | 379/196 |
| 5,903,831 A | * | 5/1999 | Foti | 455/410 |
| 5,966,650 A | * | 10/1999 | Hobson et al. | 455/410 |
| 6,212,266 B1 | * | 4/2001 | Busuioc | 379/189 |

OTHER PUBLICATIONS

Michel Mouly and Marie–Bernadette Pautet, "The GSM System for Mobile Communications", Palaiseau, France, 1998, ISBN:2–9507190–0–7.

International Search Report for PCT/FI99/01026.

Japanese Laid Open Patent Application No. S–63–193,623, entitled "Cellular Phone System Against Fraudulent Use," Feb. 5, 1987, S. Itoh.

Japanese Laid Open Patent Application No. H–9–121–387, entitled "Mobile Communication Network and a Method of Locking a Selected Mobile Phone in the Mobile Communication Network," May 6, 1997, Paul S. Meche et al.

* cited by examiner

DETECTING AND PREVENTING FRAUDULENT USE IN A TELECOMMUNICATIONS NETWORK

This application is a continuation of international application PCT/FI99/01026 filed on Dec. 10, 1999

FIELD OF THE INVENTION

The invention relates to a method and an arrangement for fraud detection and prevention in a telecommunications network, especially in a mobile communications network.

BACKGROUND OF THE INVENTION

Modern telecommunications networks offer a subscriber several supplementary services in directing a call. Call Forwarding (CF) is a supplementary service which permits a called subscriber to have the network route all incoming calls to a preset number. Call Transfer (CT) is another supplementary service which permits a subscriber to transfer an established incoming or outgoing call to a third party. Such supplementary services pose the threat of fraud, making use of telecommunication services without the intent to pay. Typically, a fraudulent user applies for a subscription with false identity and with no intention to pay any telephone bills. The most common types of fraud are related to the ability to sell calls, such as forwarded or transferred calls. In such cases, the fraudulent user programs the desired telephone number as the forwarded-to number for the fraudulent subscription, after which the caller pays only for a local call, for example. Without good control large unpaid bills could be produced by calling expensive destinations such as Premium Rate or international numbers. It is very much in the interests of the network operators to detect the misuse and stop it at the earliest possible opportunity.

FIG. 1 of the attached drawing shows a simplified block diagram of the GSM mobile communications system. The mobile station MS is connected via a radio path to a base transceiver station BTS, in FIG. 1, to the base station BTS1. A base station sub-system BSS consists of a base station controller BSC and the base stations BTS controlled by it. A mobile services switching center MSC usually controls several base station controllers BSC and is connected to other mobile services switching centers and a GMSC (Gateway Mobile Services Switching Center). Via the GMSC the GSM network is connected to other networks, such as the PSTN (Public Service Telephone Network), another mobile communication network PLMN, the ISDN network, the intelligent network IN, or the short message service center SMSC. The operation of the entire GSM system is monitored by the operation and maintenance center OMC. Subscriber data of the mobile station MS is stored permanently in the Home Location Register HLR and temporarily in the Visitor Location Register VLR of the area in which the mobile station MS is currently located. Subscriber data contains information on all the services the subscriber is entitled to and the subscriber's present location. The information as to the location of the mobile station MS is stored in the visitor location register VLR with the accuracy of a Location Area LA.

In order to limit possible fraudulent use of the network, parameters limiting the use of certain services are known to be set. These limiting parameters are common for all the subscribers. Typically, the parameters are activated for all the subscribers communicating through one network element, such as the switching center, or for none. One solution for preventing fraudulent call transfers in a radio telecommunications network is described in patent application WO 97/47152. The method in the publication restricts or disables the immediate call transfer feature if the number of call transfer requests exceeds a threshold number of requests within a predetermined time period. The method may also restrict or disable the call transfer feature if the transfer-to telephone number included in the call transfer request is not on a list of approved transfer-to telephone numbers.

The problem with known fraud prevention methods is that they provide only default values which are either used for each subscriber or not used. It is not possible to define parameter values on a subscriber basis. Yet the operator has varying needs to monitor the possible fraudulent use of different subscribers.

SUMMARY OF THE INVENTION

The object of this invention is to implement effective and flexible prevention of fraudulent use in a telecommunications network on a subscriber basis.

This is achieved through a method and an arrangement according to the invention characterized by what is stated in the independent claims. Special embodiments of the invention are presented in the dependent claims.

The invention is based on the idea that at least one fraud profile identified by an identifier is created and the identifier is included in the subscriber data of some subscribers. Based on this identifier the fraud restriction parameters of the subscriber are retrieved from the subscribers fraud profile, and these fraud restriction parameters are used in detecting and indicating possible fraudulent use. The fraud restriction parameters include values for different service limits, such as the maximum number of call forwarding requests and/or the maximum number of location updates during a certain period, and possibly at least for some features an action parameter related to a service limit and implemented when the service limit is reached.

The advantage of the method according to the invention is that the network operator is able to monitor and control the activities of the subscribers individually when the call is active. The system provides tools for the operator to monitor and limit the subscriber's calls, including transferred and forwarded calls.

Another advantage of the method according to the invention is that the management of the fraud restriction parameters is simple.

The advantage of the arrangement according to the invention is that the subscriber data file is increased only by the identifier of one of the fraud profiles, which are centrally stored in a storage separate from the subscriber data.

BRIEF DESCRIPTION OF THE DRAWINGS

The preferred embodiments of the invention will now be described with reference to the attached drawings, in which.

DETAILED DESCRIPTION OF THE INVENTION

Figure 1:
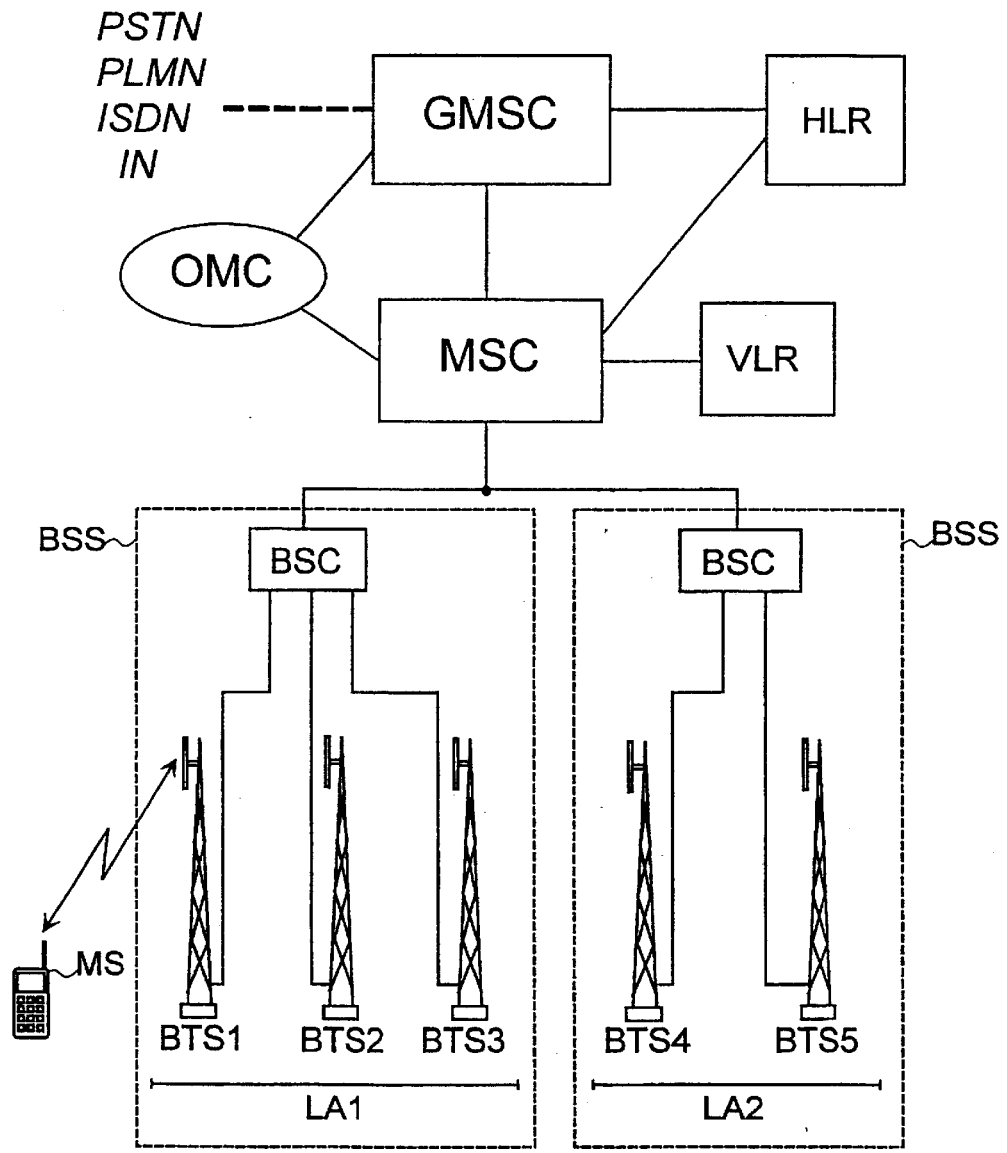
FIG. 1 shows the parts of the mobile communication network that are essential for the invention.

The present invention can be applied to any telecommunications network. The invention will be described below in more detail mostly by using the digital mobile communications system GSM as an example. FIG. 1 shows the simplified structure of a GSM network as described earlier. The GSM system is described in GSM specifications and the book: "The GSM System for Mobile Communications", M. Mouly&M. Pautet, Palaiseau, France, 1992, ISBN:2-9507190-0-7, where an interested reader can find more background information.

Figure 2:
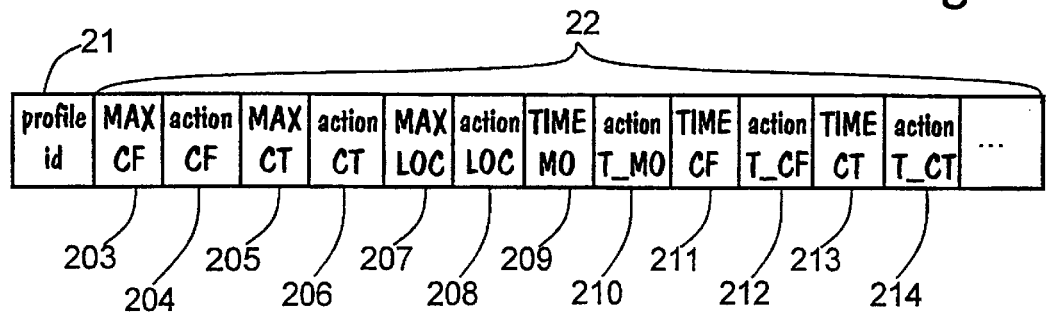
FIG. 2 shows an example structure of one fraud profile according to the invention.

In the following, the first embodiment of the invention is described in more detail with reference to FIGS. 2 and 3. FIG. 2 shows an example structure of one fraud profile file according to the invention. The fraud profile includes identifier 21 and one combination of fraud restriction parameters 22, such as restricting time limits for different type of calls, maximum values of service usage, and/or action parameters. The profile identifier 21 can be any index and/or name unambiguously identifying the fraud profile file. This same identifier is added to the subscriber data in the home location register HLR for those subscribers to whom this fraud profile is to be applied. Fraud restriction parameters 22 each relate to a certain service or a specific activity in the network, such as call forwarding, call transfer, mobile originated call, or location update. Fraud restriction parameters 203, 205, 207, 209, 211, and 213 can have values such as some number, between 1and 255, for example, "DEFAULT VALUE" indication, or "NO RESTRICTION" indication. "DEFAULT VALUE" label in a fraud restriction parameter indicates that network element specific default value is used for this fraud restriction parameter. The network element specific default values are applicable within one network element, such as the switching center MSC. "NO RESTRICTION" label in a fraud restriction parameter indicates that no restriction is applied for the subscriber relating to this service. In the example in FIG. 2, fraud restriction parameters 204, 206, 208, 210, 212, and 214 are action parameters which define the action to be taken when the limiting value relating to same feature, such as a service or network activity, is encountered. The action defined by the action parameter can be an alarm to the operator, a fraud report to the operator, or a fraud report to the operator and a restriction in the call handling, such as rejecting the requested service or terminating the call. The action taken when the limiting value is encountered can also be an MSC or VLR specific action according to prior art. No indication, i.e. no announcement or tone, is provided to the subscriber at the time of the encounter with the limiting value. Nevertheless, the subscriber gets a notification when the service requested is rejected.

A few examples of fraud restriction parameters are shown in FIG. 2. Fraud restriction parameters MAX_CF 203 and action_CF 204 relate to call forwarding. The limiting value MAX_CF is the maximum number of call forwarding requests allowed during an observation time. During a call, the unit responsible for call handling, such as an MSC, monitors the number of call forwarding requests and compares this number to the value of MAX_CF. The monitoring is implemented as in prior art. When the number of call forwarding requests exceeds the limiting value MAX_CF 203, an action is taken according to the action parameter action_CF 204. Correspondingly, MAX_CT 205 and action_CT 206 relate to call transfer, and MAX_LOC 207 and action_LOC 208 relate to location updates. The location update restriction detects and indicates an unexceptionally high activity of location updating between switching centers, for example. The fraud profile can also include fraud restriction parameters relating to specific activity in the network other than those described above, such as maximum number of mobile originated calls in a certain direction. The number of each of these activities made by a suspected fraudulent user is limited according to the corresponding limiting value whereby when the limiting value has been encountered, the action defined by the action parameter is performed.

Fraud restriction parameters according to the invention can also be set to limit the duration of some kinds of calls. Fraud restriction parameters TIME_MO 209 and action_T_MO 210 in FIG. 2 relate to mobile originating calls. The operator can set in a fraud profile a time limit value and an action parameter for mobile originated calls in general or in a specified direction, such as international calls. Correspondingly, TIME_CF 211 and action_T_CF 212 relate to the time limit for forwarded calls and TIME_CT 213 and action_T_CT 214 relate to the time limits for transferred calls. If there are several time limits for one call, e.g. when the service control point SCP limits the duration, the subscriber specific time limit is given by the fraud profile, and when a network element specific time limit exists, the shortest time limit can be chosen. In addition to the call type, the call direction can be used as a base for restricting the duration of the calls. Examples of call direction division are division by country codes, zones, routing directions, and/or division into national and international calls.

To sum up, the example in FIG. 2 requires at least the following fields to be included in the fraud profile according to the invention:

index of the fraud profile and/or—name of the fraud profile maximum number of CF registration (limiting value/no restriction/default value)

maximum number of CT invocation (limiting value/no restriction/default value)

maximum number of location updates (limiting value/no restriction/default value)

time limit for MO calls in general and/or in a certain direction (limiting value/no restriction/default value)

time limit for CF calls (limiting value/no restriction/default value)

time limit for CT calls (limiting value/no restriction/default value).

The possible content of the parameters are shown in parentheses after each parameter. In addition to the parameters listed above, the fields for the action parameters of at least some of the features can be included in the fraud profile.

Figure 3:
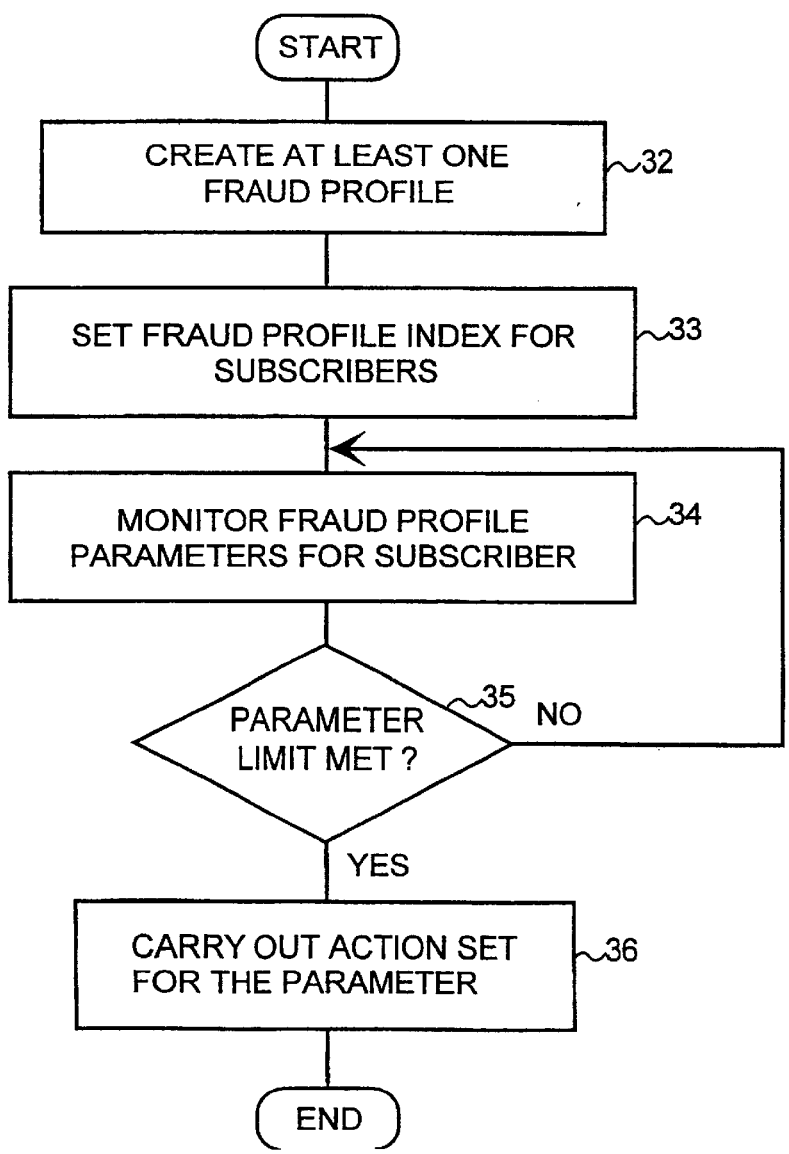
FIG. 3 shows the first embodiment of the method according to the invention as a flow chart.

FIG. 3 shows the first embodiment of the invention as a flow chart. At stage 32, at least one fraud profile file according to the invention is created. Each fraud profile is identified with an identifier. This identifier of the relevant fraud profile is set for those subscribers for whom the fraud profile in question is intended to be used in order to prevent suspected fraudulent use (stage 33). Stages 32 and 33 need to be performed at least once before the method according to the invention is implemented, but not each time the method is utilized. The parameter values set in the fraud profile of the subscriber are monitored at stage 34 according to prior art. At stage 35, it is checked whether any of the limiting parameter values are encountered. If not, the monitoring is continued at stage 34. If some limiting value is encountered, an action according to the action parameter of the fraud profile in question is carried out (stage 36). Possible actions are an alarm to the operator, a fraud report to the operator, or a fraud report to the operator and a restriction in the call handling, such as rejecting the requested service or terminating the call, as described above in the description of FIG. 2. Depending on the action parameter, the fraud detection process can be started from the beginning again, with the possible omission of stages 32 and 33.

In the second embodiment of the invention, a black list is created and incorporated in the fraud restriction procedure. The black list includes all the numbers to which call transfer is not permitted. Examples of such numbers are Premium rate and operator service numbers. The network operator can define the telephone numbers or telephone number ranges, such as all the Voice Mail numbers under the same MSC, to which calls cannot be transferred. The black list can just as well be a list of all the numbers to which call transfer is permitted. The list is preferably stored in the MSC. The second embodiment enables the operator to reject call transfers to certain suspected telephone numbers.

Figure 4:
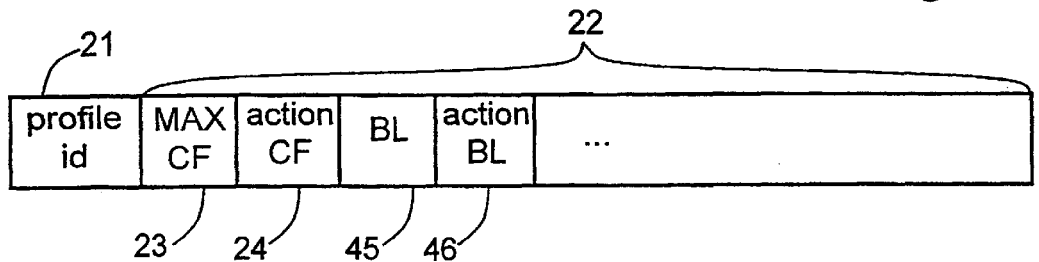
FIG. 4 shows an example structure of one fraud profile according to the second embodiment of the invention.

FIG. 4 shows an example structure of one fraud profile file according to the second embodiment of the invention. The fraud restriction parameter BL 45 can have the status "on" or "off". With this parameter the operator can set the black list restriction to "on" or "off" for a subscriber. All the Call Transfers are checked against the black list when the restriction status of the black list is "on" for a subscriber. When subscriber A is calling subscriber B and subscriber B transfers the call to subscriber C, the number checking against the black list is done for number C. Both numbers B and C are checked against the black list when subscriber A first calls subscriber B and sets subscriber B on hold while calling subscriber C and finally transfers the call with subscriber C to subscriber B. The telephone number from the Private Numbering Plan (PNP) is first converted into the actual number of the normal numbering plan before comparison with the black list. The same applies to other short numbers and area depended numbers. When analysis for the checked number matches the number on the black list, call transfer is rejected or the call is terminated according to the action parameter 46 or the network element specific action. According to prior art, the subscriber gets notification when the call transfer attempt fails. In addition to the action described above, the operator may get a fraud report about the call transfer attempts to the black list numbers. This function is available only for subscribers within the home network.

In another embodiment of the invention, the black list includes some special numbers a transfer to which cause the action according to the action parameter 46 or the network element specific action to be carried out. The action can be any action described above in connection with different embodiments of the invention. Therefore, the call is not necessarily released when call transfer to a number in the black list takes place.

In the third embodiment of the invention, a fraud restriction parameter is included in the fraud profile to restrict the number of parallel call transfers or forwardings of a subscriber. The monitoring is preferably carried out in the switching center MSC with the aid of counters counting the number of parallel call transfers or forwardings each time. When the number of parallel call transfers or forwardings of a subscriber exceeds the maximum value of parallel call transfers or forwardings, an action according to the action parameter relating to this feature is performed or alternatively a network element specific action is taken.

The fraud profile files according to the invention are preferably stored in a new file in the home location register HLR or some other database. An operator can create different kinds of fraud profiles to suit the need to supervise the activities of different subscribers. Useless fraud profiles can be deleted. The fraud profile files can preferably not be modified, so that only the fraud profile identifier stored in the individual subscriber data can be changed to refer to another fraud profile. When the subscriber is roaming within the network, the fraud profile of the subscriber is transferred via the MAP interface to the visited location register VLR to be stored as limiting values and possibly action parameters in association with the subscriber data copied from the HLR. The fraud profile procedure according to the invention allows the operator to classify the subscribers into one fraud classification according to the fraud profile set for the subscriber.

Emergency calls are normally not limited. Therefore, the operator defines the type of calls for which the fraud restriction parameters in the fraud profiles are applicable.

Figure 5:
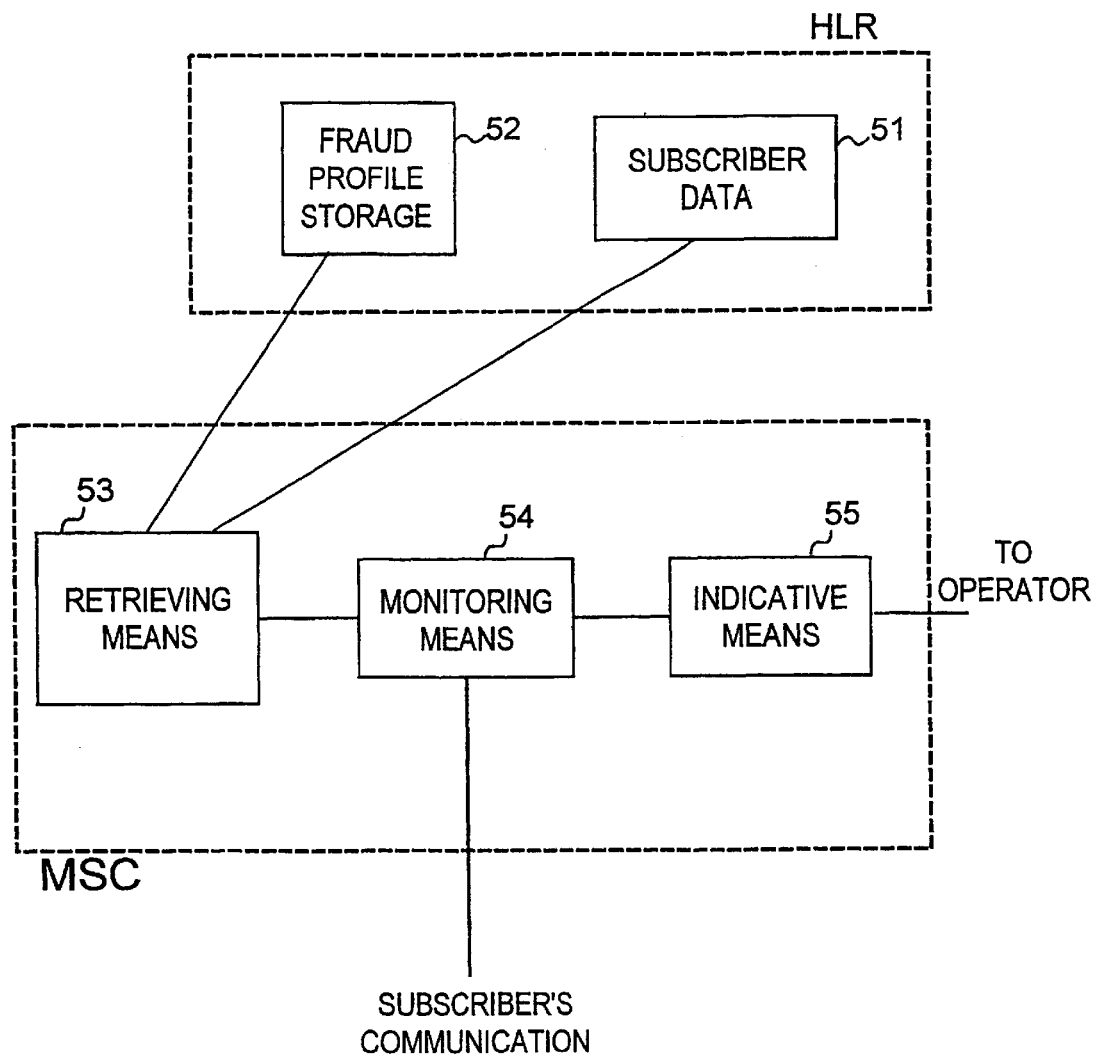
FIG. 5 shows an arrangement according to the invention as a block diagram.

FIG. 5 shows an example structure of the arrangement according to the invention. The arrangement includes subscriber data 51 according to prior art. According to the invention the arrangement includes a storage 52 including fraud profile files, retrieving means 53 for associating a subscriber with the correct fraud profile, monitoring means 54 for monitoring the subscriber's communication on the basis of the fraud profile according to the invention, and indicative means 55 for indicating an encounter with a fraud restriction parameter in the subscribers fraud profile. The retrieving means 53 associates the subscriber with the correct fraud restriction parameters based on an identifier stored in the subscriber data. The output of the indicative means 55 can be provided to the operator of the network. The storage 52 is preferably located in the home location register HLR or some other database containing the subscriber data 51. The retrieving means 53, the monitoring means 54, and the indicative means 55 can be located in association with the switching center MSC as shown in FIG. 5.

The drawings and the related description are only intended to demonstrate the principles of the invention. The details of the method according to the invention can vary within the patent claims. Although the invention is described above mainly in terms of GSM network, it may also be used with other telecommunications networks, such as Wireless Local Area Network WLAN. The invention is also applicable to data calls. As described above, each subscriber data file preferably includes reference to whether a fraud profile is used for the subscriber or not, but the invention can also be implemented only partially. For example, fraud prevention can be carried out according to prior art using network element specific default values when the subscriber data does not include a fraud profile identifier, or the limitation can be implemented on a subscriber basis according to the invention for home subscribers and based on common default values for roamers. Also fraud restriction parameters other than those described above can be included in a fraud profile according to the invention.

What is claimed is:

1. A method against fraudulent use in a telecommunications network, which includes a database for storing subscriber data, wherein the method comprising the steps of:
    creating at least one fraud profile, which includes fraud restriction parameters and an identifier identifying the fraud profile, setting for a subscriber in the subscriber data, a fraud profile using said identifier, retrieving from the at least one fraud profile, a correct fraud profile of the subscriber based on the identifier set in the subscriber data, monitoring communications of the subscriber on the basis of the fraud restriction parameters in the fraud profile of the subscriber, indicating an encounter with at least one fraud restriction parameter of the subscriber, and restricting the communication of the subscriber upon the encounter of at least one of said at least one fraud restriction parameter of the subscriber.

2. A method according to claim 1, wherein a list is created of special numbers, the fraud restriction parameters include a status parameter for call transfer restriction and an action parameter relating to call transfer restriction and defining an action to be taken on the encounter with a special number in the list, the action according to the action parameter is carried out when a call is transferred to a number on the list, on condition a call transfer restriction has been set.

3. A method according to claim 1, wherein a list is created of numbers to which call transfer is not permitted, the fraud restriction parameters include the status parameter for call transfer restriction, call transfers of the subscriber to the numbers on the list are rejected when a call transfer restriction has been set.

4. A method according to claim 1, wherein the fraud restriction parameters include at least one action parameter relating to a specific feature and the encounter with the subscriber's fraud restriction parameter of the feature is indicated with an action according to the action parameter.

5. A method according to claim 1, wherein by giving a report to the network about the encounter with a fraud restriction parameter of the subscriber.

6. A method according to claim 1, wherein by giving an alarm to the network on the encounter with a fraud restriction parameter of the subscriber.

7. A method according to claim 1, wherein by indicating to the operator of the network the encounter with a fraud restriction parameter of the subscriber.

8. An arrangement against fraudulent use in a telecommunications network, which includes a database for storing subscriber data and monitoring means for monitoring the subscriber's communication on the basis of fraud restriction parameters, wherein the arrangement includes a storage containing at least one fraud profile, which includes fraud restriction parameters and an identifier identifying the fraud profile, retrieving means for associating a subscriber with the fraud restriction parameters of a fraud profile based on an identifier stored in the subscriber data, indicative means for indicating an encounter with a fraud restriction parameter of the subscriber and restriction means for restricting the communication of the subscriber upon the encounter of a fraud restriction parameter of the subscriber.

9. An arrangement according to claim 8, wherein the fraud restriction parameters include the maximum values for the number of specific activities in the network.

10. An arrangement according to claim 9, wherein the fraud restriction parameters include at least one action parameter relating to a specific feature limited by one fraud restriction parameter and defining an action to be taken on the encounter with the fraud restriction parameter of the subscriber.

11. An arrangement according to claim 8, wherein the fraud restriction parameters include time limits for the duration of certain types of communication.

12. An arrangement according to claim 8, wherein the fraud restriction parameters include maximum values for the number of specific activities in the network and time limits for the duration of certain types of communication.

13. An arrangement according to claim 8, wherein the fraud restriction parameters include maximum values for the number of specific activities in the network and time limits for the duration of certain types and directions of communication.

14. An arrangement according to claim 8, wherein the indicative means are located in association with a switching center.

15. An arrangement according to claim 8, wherein the indicative means are located in association with the database.

16. An arrangement according to claim 8, wherein the monitoring means include means for comparing a transfer-to number relating to call transfer with a list including transfer-to numbers which are not allowed and that the indicative means include means for restricting the communication of the subscriber when the compared numbers are identical.

* * * * *

UNITED STATES PATENT AND TRADEMARK OFFICE
CERTIFICATE OF CORRECTION

PATENT NO. : 6,816,722 B2
DATED : November 9, 2004
INVENTOR(S) : Vesa Blom et al.

It is certified that error appears in the above-identified patent and that said Letters Patent is hereby corrected as shown below:

Title page,
Item [73], should read:
-- [73] Assignee: Nokia Networks Oy --.

Signed and Sealed this

Twenty-second Day of November, 2005

JON W. DUDAS
*Director of the United States Patent and Trademark Office*